US009235767B2

(12) United States Patent
Fukata et al.

(10) Patent No.: US 9,235,767 B2
(45) Date of Patent: Jan. 12, 2016

(54) DETECTION REGION MODIFICATION FOR DRIVING ASSISTANCE APPARATUS AND DRIVING ASSISTANCE METHOD

(75) Inventors: Osamu Fukata, Sagamihara (JP); Yasuhisa Hayakawa, Yokohama (JP); Chikao Tsuchiya, Cambridge, MA (US); Masanori Furuya, Beijing (CN)

(73) Assignee: Nissan Motor Co., Ltd., Yokohama (JP)

( * ) Notice: Subject to any disclaimer, the term of this patent is extended or adjusted under 35 U.S.C. 154(b) by 98 days.

(21) Appl. No.: 14/235,934

(22) PCT Filed: Jul. 17, 2012

(86) PCT No.: PCT/JP2012/068109

§ 371 (c)(1), (2), (4) Date: Jan. 29, 2014

(87) PCT Pub. No.: WO2013/018537

PCT Pub. Date: Feb. 7, 2013

(65) Prior Publication Data

US 2014/0169630 A1 Jun. 19, 2014

(30) Foreign Application Priority Data

Aug. 2, 2011 (JP) ................................ 2011-168895

(51) Int. Cl.

| | |
|---|---|
| ***G06K 9/00*** | (2006.01) |
| ***G08G 1/16*** | (2006.01) |
| ***H04N 7/18*** | (2006.01) |
| ***B60R 1/00*** | (2006.01) |

(52) U.S. Cl.

CPC ............ *G06K 9/00805* (2013.01); *B60R 1/002* (2013.01); *G08G 1/167* (2013.01); *H04N 7/18* (2013.01)

(58) Field of Classification Search

None

See application file for complete search history.

(56) References Cited

U.S. PATENT DOCUMENTS

| | | | | |
|---|---|---|---|---|
| 5,461,357 | A * | 10/1995 | Yoshioka et al. | 340/435 |
| 7,636,631 | B2 * | 12/2009 | Shimizu et al. | 701/437 |
| 8,665,079 | B2 * | 3/2014 | Pawlicki et al. | 340/435 |
| 8,814,401 | B2 * | 8/2014 | Higgins-Luthman et al. | 362/465 |
| 2001/0019363 | A1 * | 9/2001 | Katta et al. | 348/333.01 |
| 2001/0030688 | A1 * | 10/2001 | Asahi et al. | 348/118 |
| 2003/0069695 | A1 * | 4/2003 | Imanishi et al. | 701/301 |
| 2005/0174429 | A1 * | 8/2005 | Yanai | 348/148 |
| 2005/0190952 | A1 * | 9/2005 | Nagasawa et al. | 382/103 |
| 2005/0240342 | A1 * | 10/2005 | Ishihara et al. | 701/208 |
| 2008/0205706 | A1 | 8/2008 | Hongo | |

(Continued)

FOREIGN PATENT DOCUMENTS

| | | | | |
|---|---|---|---|---|
| CN | 101256073 A | | 9/2008 | |
| JP | 55140629 A | * | 11/1980 | B60R 21/14 |

(Continued)

*Primary Examiner* — Wenpeng Chen

(74) *Attorney, Agent, or Firm* — Global IP Counselors, LLP

(57) ABSTRACT

A driving assistance device is provided with a turning state detection unit, an imaging unit, a solid object detection unit and a detection region modification unit. When the turning state detection unit detects that a host vehicle is in a turning state, the detection region modification unit alters a position of a detection region with respect to the host vehicle, or alters a shape or an area of the detection region based on the turning state of the host vehicle. For example, the detection region modification unit sets a shorter region length of the detection region as the turning radius of the host vehicle becomes smaller. Hereby, the region closest to the host vehicle is set, to a limited extent, as the detection regions.

13 Claims, 15 Drawing Sheets

(56) References Cited

U.S. PATENT DOCUMENTS

| | | | | |
|---|---|---|---|---|
| 2011/0025848 | A1* | 2/2011 | Yumiba et al. | 348/148 |
| 2011/0043634 | A1* | 2/2011 | Stegmann et al. | 348/148 |
| 2012/0019655 | A1* | 1/2012 | Fukamachi et al. | 348/142 |
| 2012/0221207 | A1* | 8/2012 | Nakamura | 701/41 |

FOREIGN PATENT DOCUMENTS

| | | | | | |
|---|---|---|---|---|---|
| JP | 8-110224 | A | | 4/1996 | |
| JP | 2000-214256 | A | | 8/2000 | |
| JP | 2000214256 | A | * | 8/2000 | G01S 13/93 |
| JP | 2006-253872 | A | | 9/2006 | |
| JP | 2007-221199 | A | | 8/2007 | |
| JP | 2008-219063 | A | | 9/2008 | |
| JP | 2008-277646 | A | | 11/2008 | |
| JP | 2009083632 | A | * | 4/2009 | |
| JP | 2009-265783 | A | | 11/2009 | |
| JP | 2010221863 | A | * | 10/2010 | |
| JP | 2010256995 | A | * | 11/2010 | |

* cited by examiner

DETECTION REGION MODIFICATION FOR DRIVING ASSISTANCE APPARATUS AND DRIVING ASSISTANCE METHOD

CROSS-REFERENCE TO RELATED APPLICATIONS

This application is a U.S. National stage application of International Application No. PCT/JP2012/068109, filed Jul. 17, 2012, which claims priority under to Japanese Patent Application No. 2011-168895 filed in Japan on Aug. 2, 2011.

BACKGROUND

1. Field of the Invention

The present invention relates to a driving assistance device and a driving assistance method.

2. Background Information

There is known a driving assistance device that performs driving assistance by detecting a solid object around the vehicle. For example, this kind of driving assistance device processes the captured image output chronologically from an imaging unit to detect the solid object.

For instance, Japanese Unexamined Patent Publication No. 2008-227646 discloses an obstacle detection device capable of realizing the detection of solid objects. The obstacle detection device is provided with a real camera that photographs the surroundings of the vehicle, and an obstacle detection means for detecting a solid object using the image of the surroundings of the vehicle input from the real camera. The obstacle detection means converts the viewpoint of the image of the surroundings of the vehicle from the real camera, and detects the solid object using a difference image which corresponds to the difference between two chronologically different bird's-eye view images.

SUMMARY

However, as with the technique disclosed in Japanese Unexamined Patent Publication No. 2008-227646, if the difference between the two chronologically different bird's-eye view images is used in solid object detection, when the vehicle is turning, for example, the display of the road surface is falsely recognized as a solid object, and possibly leads to a deterioration in the detection accuracy because the change in the vehicle's behavior is included in the difference image as noise.

In view of this situation, the present invention aims to suppress the deterioration of the detection accuracy attributable to the turning state of the vehicle when detecting solid objects.

To address this problem, the present invention has a turning state detection means for detecting the turning state of a host vehicle. When the turning state detection means detects that the host vehicle is in a turning state, a detection region modification means alters the position of a detection region with respect to the host vehicle, or the shape or the area of the detection region based on the turning state of the host vehicle.

According to the present invention, if the host vehicle is in the turning state, to prevent the false recognition of a solid object, a region which tends to generate a false recognition of a solid object can be excluded when carrying out recognition by altering the position of the detection region with respect to the host vehicle, or by altering the shape or the area of the detection region based on the turning state of the host vehicle, and thus the false recognition of solid objects can be controlled. Hereby, it is possible to suppress the deterioration of the detection accuracy attributable to the turning state of the vehicle when detecting solid objects.

BRIEF DESCRIPTION OF THE DRAWINGS

Referring now to the attached drawings which form a part of this original disclosure.

DETAILED DESCRIPTION OF THE EMBODIMENTS

Figure 1:
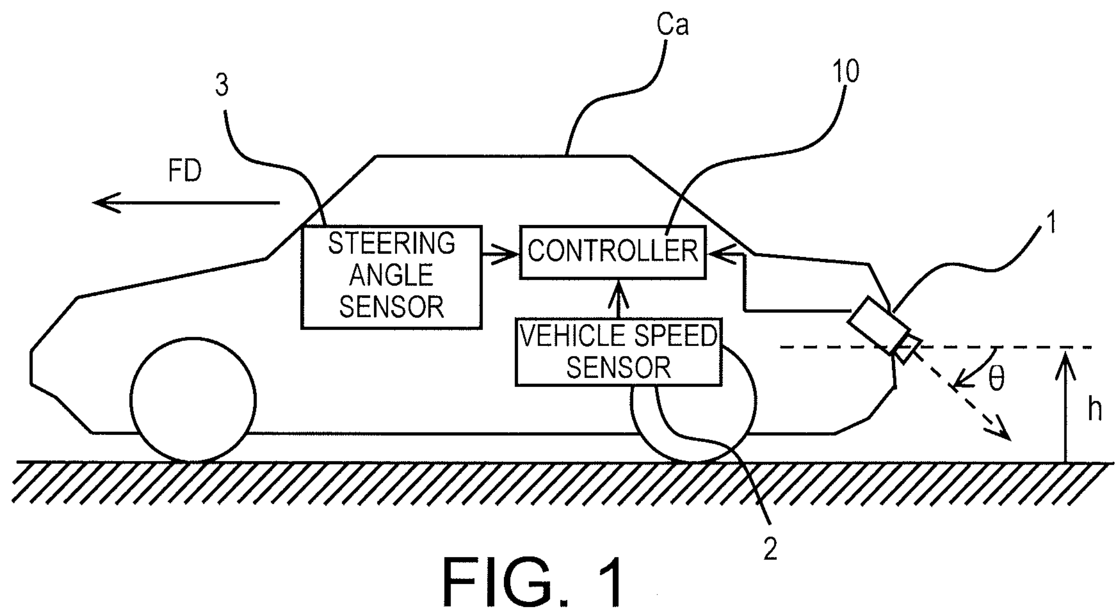
FIG. 1 is an explanatory diagram schematically illustrating a configuration of a driving assistance device.

FIG. 1 is an explanatory diagram schematically illustrating the configuration of a driving assistance device according to the present embodiment. The driving assistance device detects a trailing vehicle approaching from behind a vehicle (host vehicle), and is configured primarily by a controller 10.

The controller 10 functions to comprehensively control the entire system, and for example, the controller 10 may use a microcomputer configured primarily with a CPU, a ROM, a RAM, and an I/O interface. The controller 10 carries out the various computations needed for driving assistance in accordance with the control programs stored in the ROM. The controller 10 receives the information input from a camera 1, a wheel speed sensor 2, and a steering angle sensor 3.

The camera 1 may be positioned for example, at a height h above a road surface, and placed at the rear of the host vehicle Ca at an angle (high angle) θ formed by a horizontal plane at the camera height and the center of the camera; the camera 1 may have a built-in image sensor (for example, a CCD or a CMOS sensor). As illustrated in FIG. 1, the camera 1 periodically captures a landscape including a predetermined detection region (later described), and thereby chronologically outputs a captured image (imaging means).

The wheel speed sensor 2 is provided on each of the front, rear, left, and right wheels, and detects the rotational speed of the wheel. The wheel speed sensor 2 detects the equivalent vehicle speed for the host vehicle Ca through the rotational speed of each of the wheels. The steering angle sensor 3 is, for example, an angular sensor installed on the steering column or near the steering wheel, and detects the rotation angle of the steering shaft as the steering angle.

Figure 2:
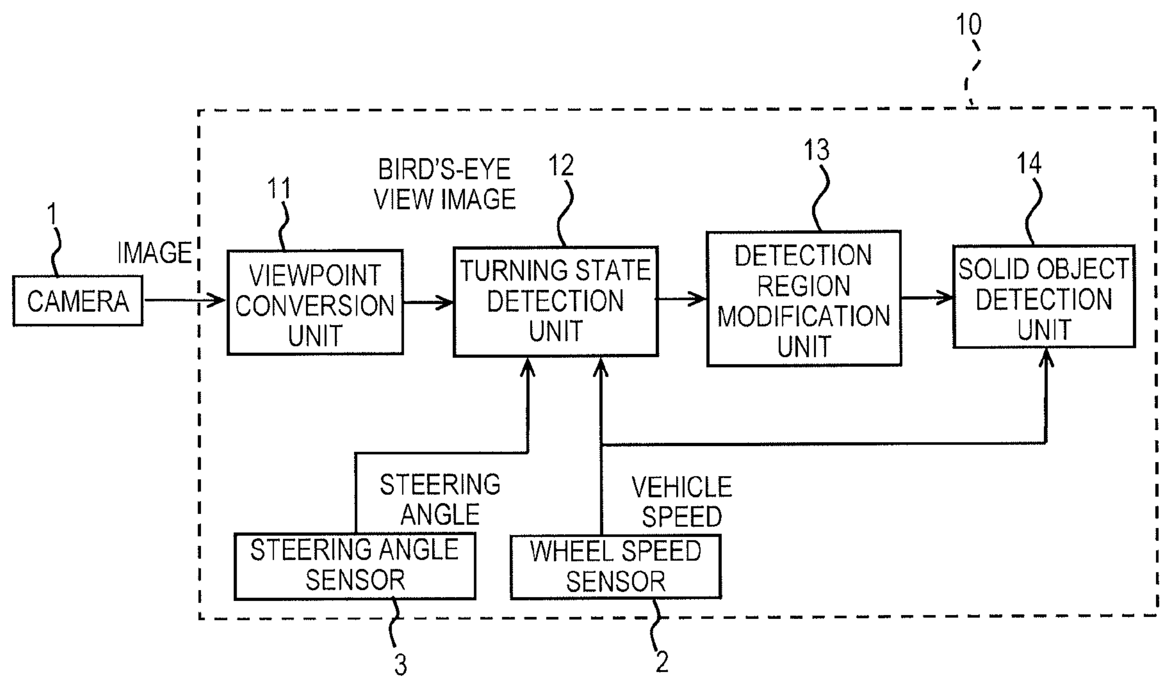
FIG. 2 is a block diagram functionally illustrating the configuration of a driving assistance device according to a first embodiment.

FIG. 2 is a block diagram functionally illustrating the configuration of the driving assistance device according to the present embodiment. In the driving assistance device, the controller 10 performs a predetermined process on the captured images output chronologically from the camera 1, and detects the trailing vehicle based on the image obtained from the processing. If taking over the functions of the driving assistance device, the controller 10 will have a viewpoint conversion unit 11, a turning state detection unit 12, a detection region modification unit 13, and a solid object detection unit 14.

The viewpoint conversion unit 11 converts a captured image output from the camera 1 into a bird's-eye view image (high angle image) through viewpoint conversion. The bird's-eye view image is a conversion of the captured image from the actual camera 1 into a virtual image captured from a viewpoint (virtual viewpoint) from a virtual camera. More specifically, the bird's-eye view image corresponds to an image where the captured image from the actual camera 1 has the viewpoint converted to an image looking down onto the ground from a point on the map of a predetermined height (in other words, an image wherein the captured image is projected onto the road surface).

The turning state detection unit 12 detects the turning state of the host vehicle Ca including the turning radius of the host vehicle Ca, and the turning direction, based on the detection information from the wheel speed sensor 2 and the steering angle sensor 3. Additionally, the turning state detection unit 12 predicts the turning state of the host vehicle Ca including the turning radius, and the turning direction of the host vehicle Ca. Moreover, the turning state detection unit 12 determines whether or not the host vehicle Ca is in the turning state in accordance with the detection result or a prediction result.

The detection region modification unit 13 modifies the form of a detection region based on the turning state detected by the turning state detection unit 12. The techniques for modifying the form of a detection region will be described later.

The solid object detection unit 14 detects a solid object based on two chronologically successive bird's-eye view images. Here, the "two chronologically successive bird's-eye view images" signifies two bird's-eye view images taken at different photograph times; for example, this corresponds to a bird's-eye view image based on an image captured at a time t1 (present) (referred to below as the "present bird's-eye view image"), and a bird's-eye view image based on an image captured at a time t2 (t1−Δt (Δt: the output frequency of an image); referred to below as "past bird's-eye view image").

More specifically, the solid object detection unit 14 first aligns the two chronologically successive bird's-eye view images, in other words, the solid object detection unit 14 aligns the present bird's-eye view image, and the past bird's-eye view image. Next, the solid object detection unit 14 obtains a difference image between the two bird's-eye view images. The solid object detection unit 14 then detects a solid object based on the computed difference image (solid object detection means). In this case, the solid object detection unit 14 detects the solid object within the detection regions at the rear-left and the rear-right of the host vehicle Ca, and more specifically, the solid object detection unit 14 will detect the solid object within a region corresponding to an adjacent traffic lane as the trailing vehicle (an adjacent vehicle).

Figure 3:
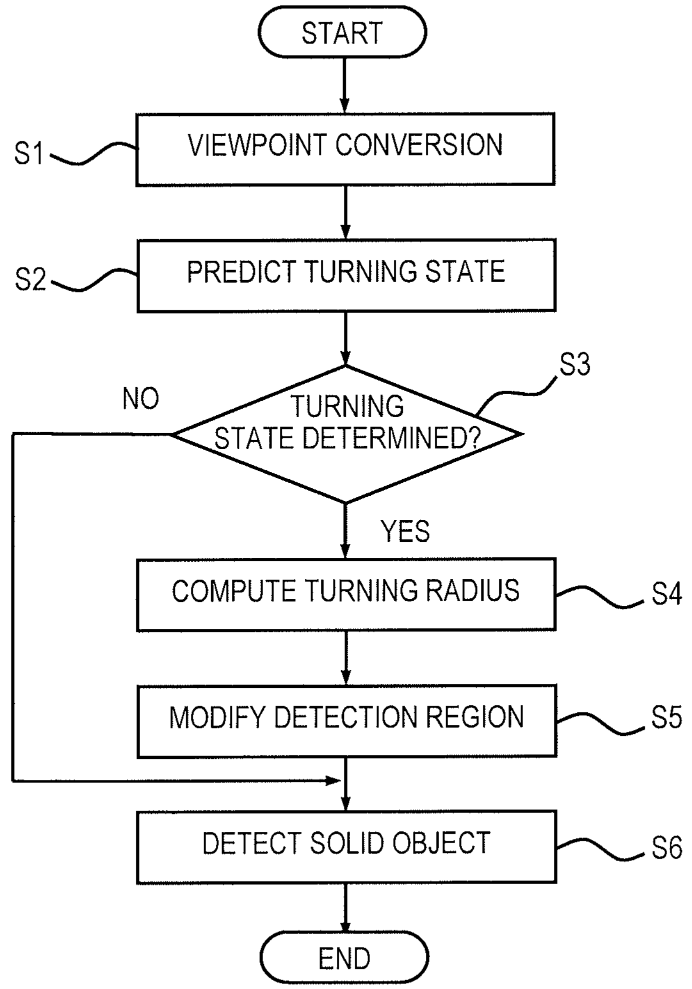
FIG. 3 is a flowchart illustrating a series of operation procedures performed by the driving assistance device.
Figure 4:
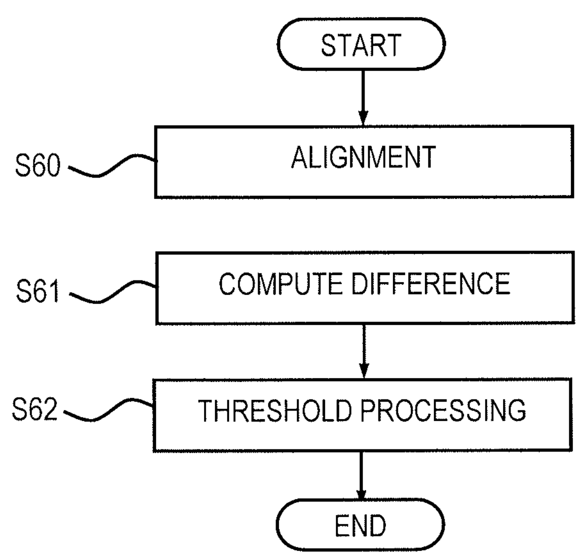
FIG. 4 is a flowchart detailing the procedures for the solid object detection used in step 6.

FIGS. 3 and 4 are flowcharts illustrating a series of operation procedures performed by the driving assistance device according to the present embodiment. The processes illustrated in the flowcharts are executed by the controller 10 at predetermined periods.

First, in step 1 (S1), when the viewpoint conversion unit 11 acquires a captured image from the camera 1, the viewpoint conversion unit 11 performs a viewpoint conversion thereon and generates a bird's-eye view image.

In step 2 (S2), the turning state detection unit 12 predicts whether or not the host vehicle Ca will be in a turning state after a predetermined time (predict turning state). More specifically, the turning state detection unit 12 references the captured image from the camera 1, detects a traffic lane (for example, the white line) on the road, and calculates a lane curvature as a parameter that represents the shape of the road. The turning state detection unit 12 predicts the shape of the road in front of the host vehicle Ca, and more specifically, the turning state of the host vehicle Ca up to the point after the predetermined time, based on the calculated lane curvature, and the vehicle speed obtained from the wheel speed sensor 2.

In step 3 (S3), the turning state detection unit 12 determines whether or not the host vehicle Ca is in a turning state. More specifically, the turning state detection unit 12 references the vehicle speed obtained from the wheel speed sensor 2, and the steering angle obtained from the steering angle sensor 3, and computes the present turning radius of the host vehicle Ca based on the following formula.

$$\rho=(1+KV^2)(nL/\phi) \quad \text{[Formula 1]}$$

In this formula, ρ is the turning radius, k is the stability factor, V is the vehicle speed, L is the wheelbase, n is the steering-wheel gear ratio, and ϕ is the steering angle.

Finally, when the present turning radius computed based on the formula 1, and the predicted turning radius in step 2 is not less than a predetermined threshold, the turning state detection unit 12 determines that the host vehicle Ca is in the turning state.

If the result at step 3 is determined to be affirmative, in other words, if the host vehicle Ca is in the turning state, processing continues to step 4 (S4). Whereas, if the result at step 3 is determined to be the negative, in other words, if the host vehicle Ca is not in the turning state, processing continues to step 6 (S6).

In step 4, the present turning radius is finally determined based on the turning radius computed in the previously described steps 2, and 3. More specifically, in addition to referencing the time information, the turning state detection unit 12 predicts the present turning radius based on the predicted turning radius until after the predetermined time predicted step 2. The turning state detection unit 12 compares the predicted present turning radius with the turning radius calculated in step 3, and calculates a likelihood (in other words, a degree of plausibility) for the predicted present turning radius. When the likelihood is not less than a predetermined decision value, the turning state detection unit 12 specifies the predicted turning radius after the predetermined time predicted in step 2 as the final turning radius; whereas, when the likelihood is less than the predetermined decision value, the turning state detection unit 12 finally determines the turning radius calculated in step 3 as the final turning radius.

Figure 5:
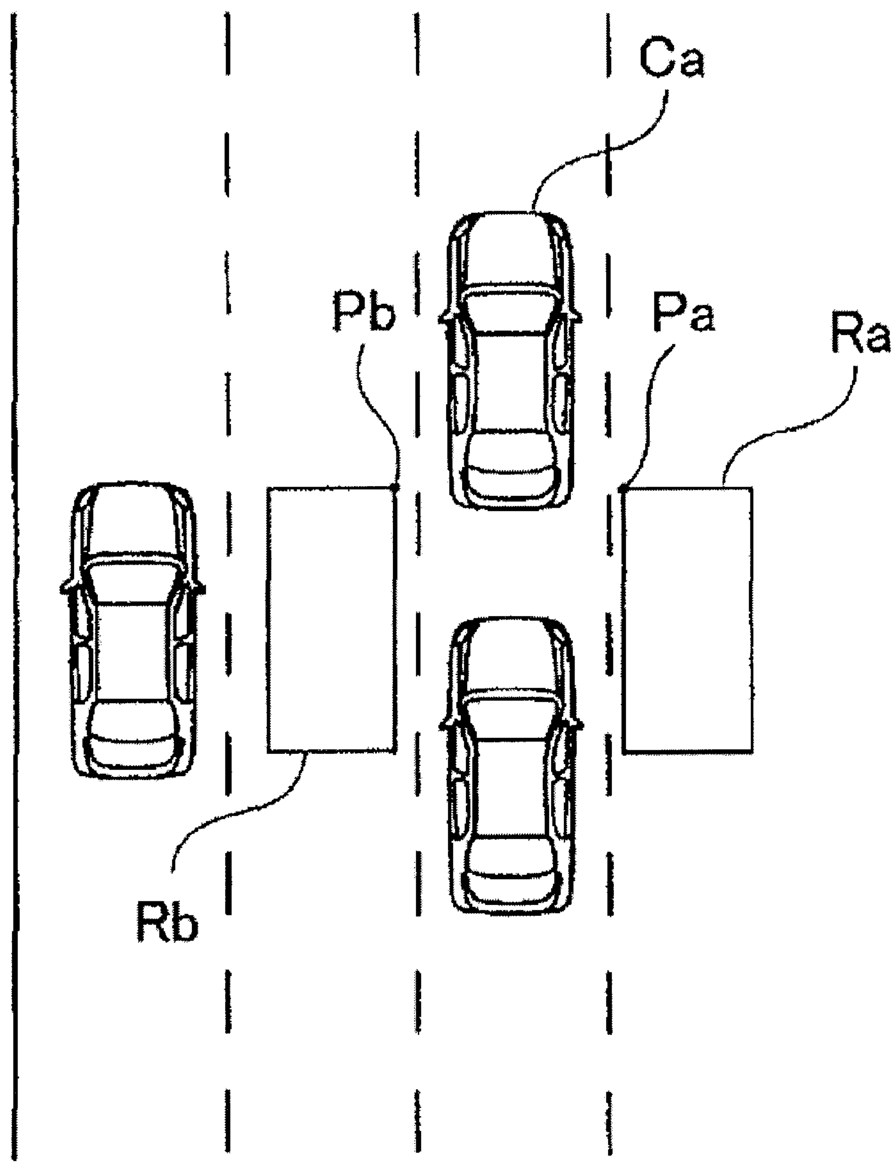
FIG. 5 is a diagram for describing the detection regions Ra, Rb.

In step 5, the detection region modification unit 13 modifies the form of the detection region based on the final turning radius specified in step 4. As illustrated in FIG. 5, the detection regions are square regions Ra, Rb having a predetermined region length in the traveling direction FD, and having symmetry with respect to the host vehicle Ca and a predetermined region width in a direction orthogonal to the traveling direction FD; the detection regions are set to extend behind the vehicle from reference positions Pa, Pb which are set at the rear-left and the rear-right of the host vehicle Ca as the points of origin. When the host vehicle Ca is traveling in a straight line, the detection regions are set to have a position and a size so as to be in the adjacent traffic lanes at the rear-left and the rear-right of the host vehicle Ca; thus the reference positions, the region lengths and the region widths are preliminary defined in accordance therewith.

Figure 6:
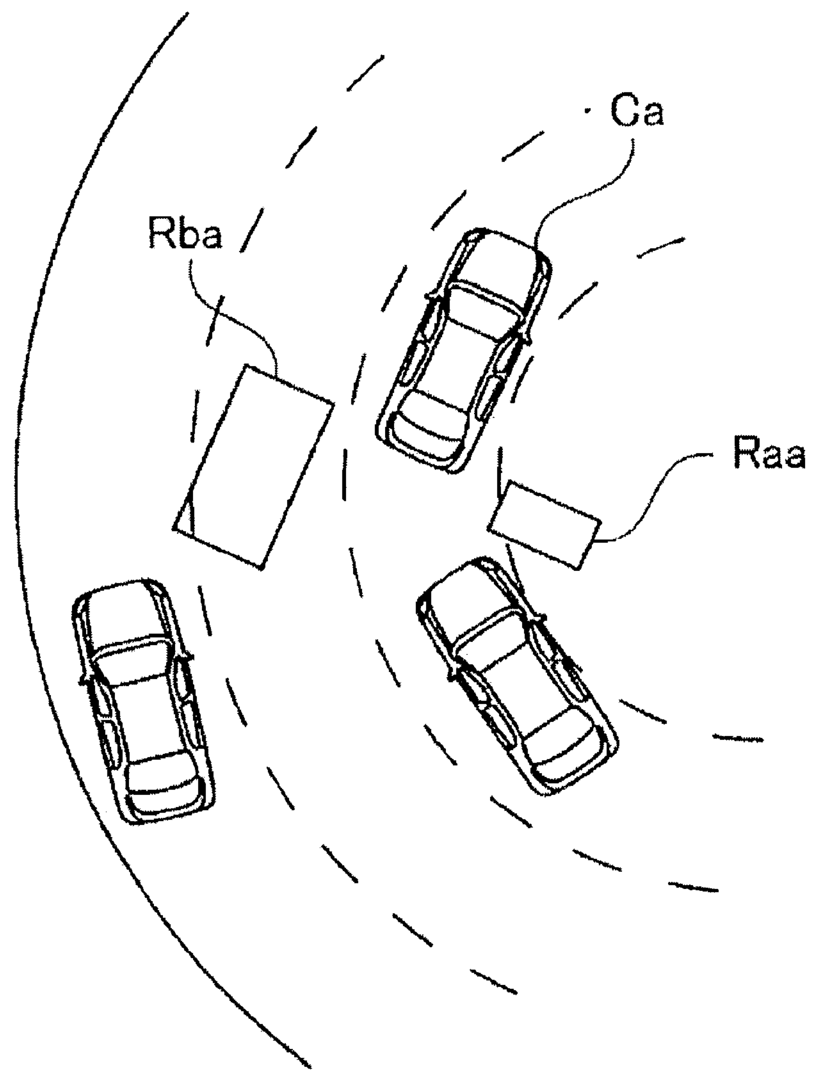
FIG. 6 is a diagram for describing the state where the form of the detection regions Raa, Rba is modified during the turning state.

Incidentally, when the turning state detection unit 12 determines that the vehicle is in the turning state, as illustrated in FIG. 6, the detection region modification unit 13 modifies the region length of the detection regions (detection regions Raa, Rba) to be shorter in the traveling direction than the detection regions Ra, Rb which is used as a reference (refer to FIG. 5). Additionally, the modified detection regions Raa, Rba are set so that the detection regions Raa, Rba corresponding to the inside of the turn has a larger degree of modification than the detection regions Raa, Rba corresponding to the outside of the turn. Hereby, the detection regions Ra, Rb which are symmetrical with respect to the host vehicle Ca are modified to an asymmetrical form (detection regions Raa, Rba).

The degree of modification of each of the detection regions Raa, Rba is determined in accordance with the turning radius, that is, the degree of modification is determined in accordance with the turning radius to exclude the detection region which may generate a false recognition of a solid object; for example, a relationship is established such that the smaller the turning radius, the relatively larger the degree of modification of each of the detection regions Raa, Rba. However, as previously described, the relationship is established so that the degree of modification differs for the detection regions Raa, Rba on the inside of the turn and the detection regions Raa, Rba on the outside of the turn even in the same turning state.

For instance, the detection region modification unit 13 may maintain a map or an arithmetic expression or a correspondence relationship between the turning radius, and the detection regions Raa, Rba modified in accordance with the turning radius. Thus, the detection region modification unit 13 may set a modified detection regions Raa, Rba based on the final turning radius specified in step 4.

In step 6 (S6), the solid object detection unit 14 detects a solid object. FIG. 4 is a flowchart detailing the procedures for the solid object detection used in step 6.

First, in step 60 (S60), the solid object detection unit 14 performs an alignment using the present bird's-eye view image and the past bird's-eye view image. Here, "alignment" means processing a position in the one bird's-eye view image (past bird's-eye view image) to align with the other bird's-eye view image (present bird's-eye view image) so that the locations correspond between the two chronologically successive bird's-eye view images for a reference standing object in the images, such as the white line on the road surface, a traffic sign, or a piece of dirt. While various techniques are available for performing alignment in the present embodiment, in order to reduce the number of computations, the alignment technique used involves calculating the amount of movement of the host vehicle Ca during one imaging cycle of the camera 1 from the vehicle speed, and offsetting one of the bird's-eye view images by the amount of movement. If accuracy is a priority, the alignment may be performed between the bird's-eye view images so that the reference standing objects therein match using a matching process and the like.

In step 61 (S61), the solid object detection unit 14 generates a difference image. More specifically, the solid object detection unit 14 calculates a difference between the common portions of the aligned present bird's-eye view image and past bird's-eye view image, and produces the computation results as the difference image. While the difference may be computed using a method based on the absolute difference in the brightness values, the difference may also be computed by performing edge point detection using a Laplacian filter and so forth, and calculating the difference based on the positions of the edge points.

In step 62 (S62), the solid object detection unit 14 carries out threshold processing. More specifically, the solid object detection unit 14 converts the difference image into binary using a predetermined threshold whereby a region not less than the threshold specifies a solid object. Further, the solid object detection unit 14 detects the solid object within the detection regions Ra, Rb, or the modified detection regions Raa, Rba as an adjacent vehicle (more specifically, a vehicle traveling side-by-side, which is a trailing vehicle traveling in the adjacent traffic lane).

In this manner in the first embodiment, the detection region modification unit 13 compares the case where the turning state detection unit 12 determines that the host vehicle Ca is in the turning state and the case where the turning state detection unit 12 determines that the host vehicle Ca is not in the turning state (FIG. 5), and modifies the form of the detection region to exclude a region which may generate a false recognition of a solid object. In other words, the detection region modification unit 13 modifies the shape and the area of the detection regions to shorten the region length of the detection region in the traveling direction, and can thereby exclude a region which tends to generate a false recognition of a solid object from the detection regions.

Solid object detection based on the captured images taken from the rear of the vehicle is such that the farther away a solid object from the host vehicle Ca, the more the difference image is affected by the noise attributable to the turning behavior of the vehicle Ca; hereby there is the disadvantage that the solid object may be falsely recognized. At this point, according to the present embodiment, when the host vehicle Ca is in the turning state, modifying the shape and the area of the detection region to exclude detection regions which may generate a false recognition of a solid object can thereby exclude the detection regions which may generate a false recognition as necessary. Hereby, it is possible to suppress the deterioration of the detection accuracy attributable to the turning state of the host vehicle Ca.

Furthermore, the detection region modification unit 13 modifies the region length in the traveling direction of the vehicle of the detection region on the inside of the turn (detection regions Raa, Rba in FIG. 6) in accordance with the turning radius of the host vehicle Ca. In the present embodiment, the smaller the turning radius of the host vehicle Ca the shorter the detection region modification unit 13 sets the region length of the detection region. Hereby, the region closest to the host vehicle Ca is set, to a limited extent, as the detection regions Raa, Rba.

According to this configuration the region further away from the host vehicle Ca may be excluded from the detection region, and therefore, it is possible to suppress the deterioration of the detection accuracy attributable to the turning state of the host vehicle Ca. Moreover, this kind of modification to the form of the detection region is sufficient if carried out on at least the detection region on the inside of the turn.

Figure 7:
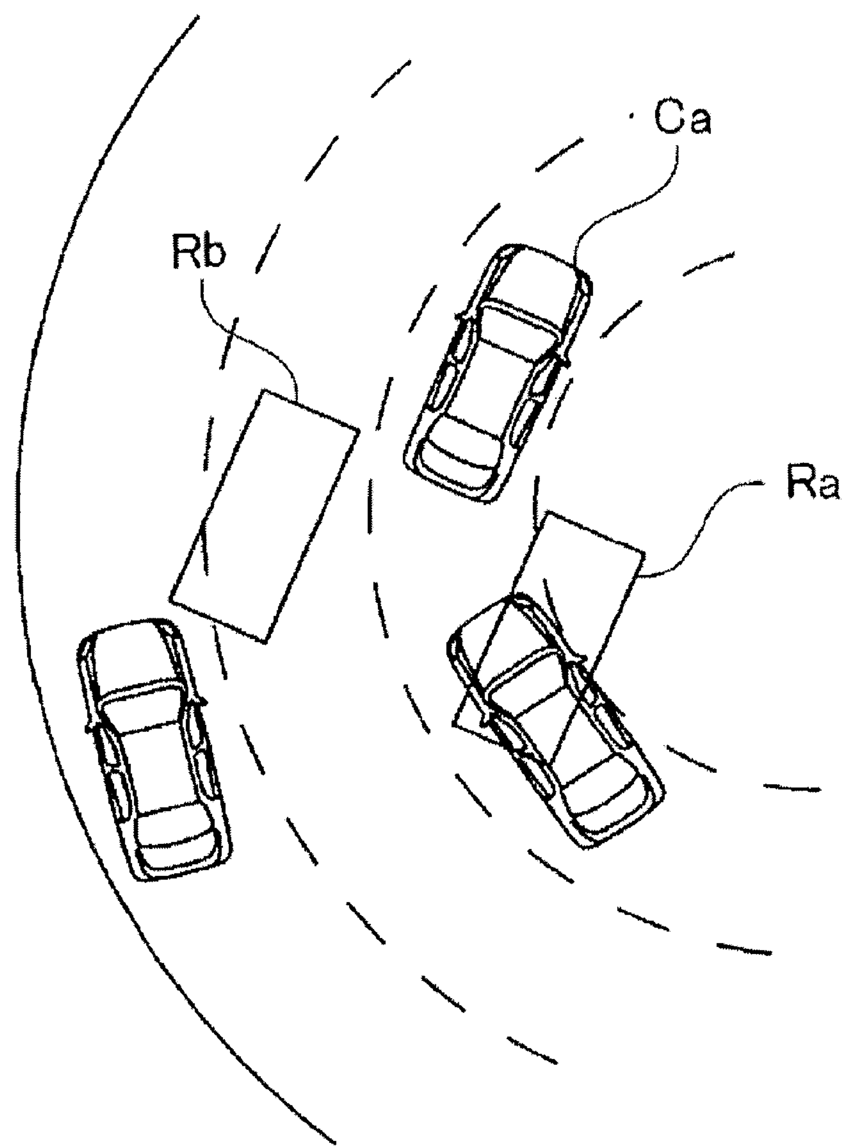
FIG. 7 is a diagram for describing the state where the form of the detection regions Ra, Rb is not modified during the turning state.

As illustrated in FIG. 7, if while the host vehicle Ca is turning the detection region (regions Ra, Rb) is set in the same manner as when the host vehicle Ca is not turning, the detection regions Ra, Rb will include a range away from the adjacent traffic lane, and this possibly becomes the primary factor for the deterioration in the detection accuracy. However, according to the present embodiment, modifying the region length of the detection region in the vehicle traveling direction FD can thereby extend the modified detection regions Raa, Rba to a range corresponding to the adjacent traffic lane. Hereby, it is possible to suppress the deterioration of the detection accuracy attributable to the turning state of the host vehicle Ca.

Furthermore the detection region modification unit 13 modifies the shape and the area of the individual detection regions so that the degree of modification to the region length of the detection regions Raa, Rba corresponding to the inside of the turning direction is larger than the region length of the detection regions Raa, Rba corresponding to the outside of the turning direction.

As illustrated in FIG. 7, the detection regions Ra, Rb corresponding to the inside in the turn direction has a larger number of regions that are away from the adjacent traffic lane. Therefore, ensuring that the degree of modification to the region length in each of the outside and the inside of the turning direction is different can thereby appropriately set the detection regions Raa, Rba. Hereby, the necessary solid object may be appropriately detected while suppressing the false detection of solid objects.

Furthermore, in the present embodiment the turning state detection unit 12 has a turning state prediction means for predicting the turning state of a vehicle as a function therefor, while the detection region modification unit 13 modifies the shape and the area of the detection regions when the turning state prediction means predicts the turning state of the host vehicle Ca. Hereby, the necessary solid object may be appropriately detected while suppressing the false detection of solid objects.

According to this configuration, the detection regions can be modified in addition to anticipating the turning state, and therefore it is possible to modify the detection regions at the appropriate time.

When the turning state is predicted and the form of the detection regions is to be modified in accordance therewith, the detection region modification unit 13 may perform the modification promptly, while on the other hand, when transitioning from the turning state to the non-tuning state and the detection regions are to be returned to the initial state (reference state), the detection region modification unit 13 may perform the modification slowly. Hereby, situations where noise is extracted in the difference image because of the turning state of the host vehicle can be suppressed, and therefore the false detection of the solid object can be suppressed. Furthermore, this kind of control method is particularly effective in the case where the turning state of the host vehicle is caused by the host vehicle Ca changing traffic lanes. In this case, it is preferable that the controller 10 be provided with functional elements such as a lane-change intent detection means for detecting the intent to change traffic lanes; the previously described technique may be adopted when the lane-change intent detection means detects the intent to change traffic lanes, and the vehicle transitions from the turning state to the non-turning state, and the detection region is returned to the initial state.

Moreover, the detection region modification unit 13 may modify the form of the detection regions in accordance with a variation in the longitudinal acceleration of the host vehicle Ca. The longitudinal acceleration of the host vehicle Ca also tends to be extracted into the difference image as noise attributable to the behavior of the vehicle Ca; this hereby triggers the possibility of the deterioration in the detection accuracy. Therefore, taking into consideration the variation in the longitudinal acceleration and modifying the form of the detection region can thereby suppress the deterioration of the detection accuracy attributable to the turning state of the vehicle.

Figure 8:
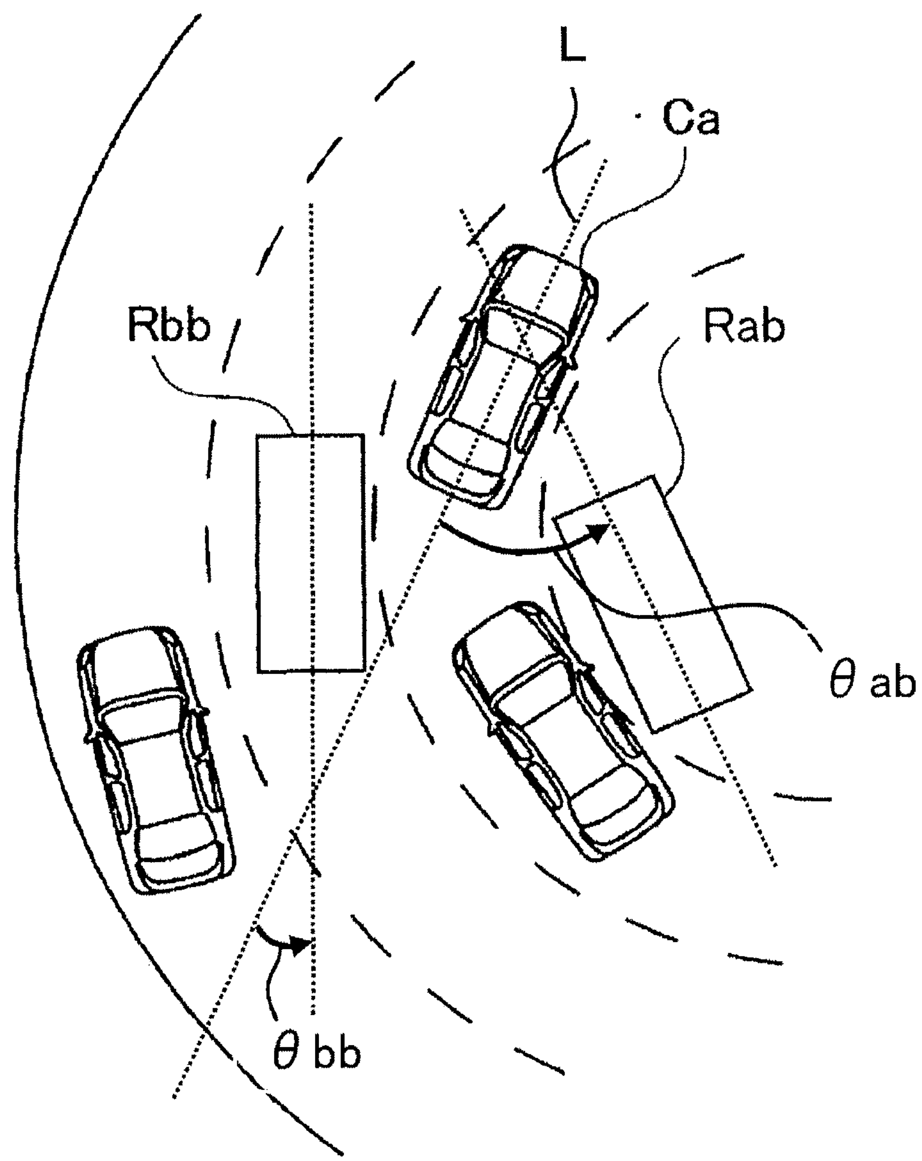
FIG. 8 is a diagram for describing the state where the form of the detection regions Rab, Rbb is modified during a turning state.

FIG. 8 is an explanatory diagram schematically illustrating the modification of the form of the detection regions Rab, Rbb according to the second embodiment. A vehicle driving assistance device according to the second embodiment will be described below. The distinct feature between the vehicle driving assistance device according to the second embodiment, and the first embodiment is the technique the detection region modification unit 13 uses to modify the detection regions. The features that are duplicated with the first embodiment will be omitted from this explanation and the following will contain mainly an explanation of the distinct feature.

In the present embodiment, the detection regions are square regions having a predetermined region length in the traveling direction FD, and a predetermined region width in a direction orthogonal to the traveling direction FD; each of the reference positions Pa, Pb are set respectively at the rear-left and the rear-right of the host vehicle Ca, and the detection regions are set to extend rearward with the reference positions as an origin point.

In a scene where the turning state detection unit 12 determines that the vehicle is in the turning state, the detection region modification unit 13 sets the detection regions Rab, Rbb at a shifted position, as illustrated in FIG. 8, versus the detection regions Ra, Rb (refer to FIG. 5) which are used as a reference. More specifically, the detection region modification unit 13 sets the detection regions Rab, Rbb at a position rotated and moved in a reverse direction to the turning direction of the host vehicle Ca with respect to the detection regions Ra, Rb (refer to FIG. 5) which are used as a reference. For example, as illustrated in FIG. 8, when the host vehicle Ca is turning toward the right direction, the detection region modification unit 13 sets the detection regions Rab, Rbb to a position rotated and moved to the left direction with respect to detection regions Ra, Rb illustrated in, for example, FIG. 7. In this manner, rotating the detection regions Rab, Rbb in the reverse direction to the turning direction of the host vehicle Ca can thereby rotate and move the detection regions Rab, Rbb along the shape of the road, as illustrated in FIG. 8. Furthermore, among the detection regions Rab, Rbb, the detection region modification unit 13 modifies the shape of the individual detection regions Rab, Rbb, so that the degree of the modification to the detection regions Rab, Rbb corresponding to the inside of the turning direction is larger than the degree of modification to the detection regions Rab, Rbb corresponding to the outside of the turning direction. For example, in the example illustrated in FIG. 8, let θbb be the angle of rotation of the detection region Rbb with respect to a center line of the host vehicle Ca in the traveling direction FD, and let θab be the angle of rotation of the detection region Rab with respect to the center line L of the host vehicle Ca in the traveling direction FD, then the detection region modification unit 13 will rotate and move the detection regions Rab, Rbb so that the angle of rotation θab of the detection region Rab corresponding to the inside of the turning direction is larger than the angle of rotation θbb of the detection region Rbb corresponding to the outside of the turning direction.

The degree of modification to each of the detection regions Rba, Rbb is determined in accordance with the turning radius of the host vehicle Ca during the turning state of the host vehicle Ca to follow the shape of the road. For example, the detection region modification unit 13 will set the detection regions Rab, Rbb so that the smaller the turning radius of the host vehicle Ca the larger the angle of rotation (θab, θbb) of the detection regions Rab, Rbb. Thus, as previously described, the degree of modification differs between the detection regions Rab, Rbb on the inside of the turning direction, and the corresponding detection regions Rab, Rbb on the outside thereof, even in the same turning state.

For instance, the detection region modification unit 13 may maintain a map or an arithmetic expression for a correspondence relationship between the turning radius, and the detection regions Rab, Rbb modified in accordance with the turning radius. The detection region modification unit 13 modifies the detection regions Rab, Rbb based on the final turning radius specified in step 4.

In this manner, in the present embodiment the detection region modification unit 13 rotates and moves the position (detection regions Rab, Rbb in FIG. 8) of the detection region in accordance with the turning radius of the host vehicle Ca.

According to this configuration, moving, or more specifically rotating the detection region in the vehicle traveling direction FD to follow the shape of the road, can thereby extend the moved detection regions Rab, Rbb to include a range corresponding to an adjacent traffic lane. Hereby, it is possible to suppress the false detection of solid objects attributable to the turning state of the host vehicle Ca.

Figure 9:
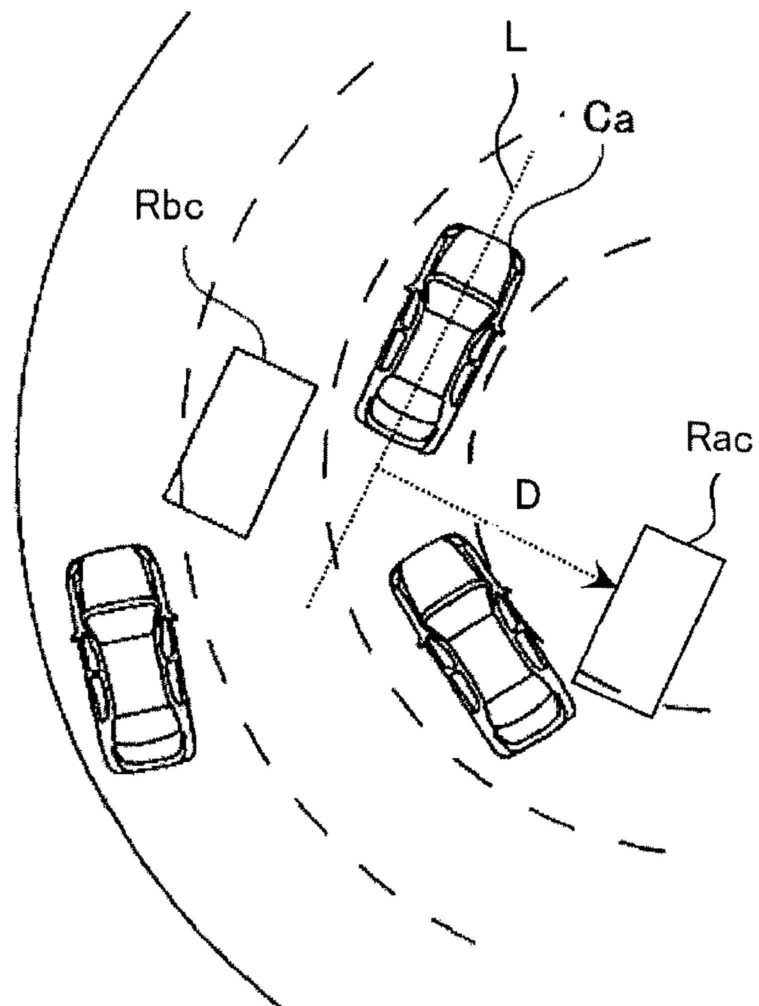
FIG. 9 is a diagram for describing the state where the form of the detection regions Rac, Rbc is modified during a turning state.

FIG. 9 is an explanatory diagram schematically illustrating the modification of the form of the detection regions Rac, Rbc according to the third embodiment. A vehicle driving assistance device according to the third embodiment will be described below. The distinct feature between the vehicle driving assistance device according to the third embodiment, and the first embodiment is the technique the detection region modification unit 13 uses to modify the detection regions. The features that are duplicated with the first embodiment will be omitted from this explanation and the following will contain mainly an explanation of the distinct feature.

In the third embodiment, when the turning state detection unit 12 determines the vehicle is in the turning state, as illustrated in FIG. 9, the position of the detection regions Rac, Rbc corresponding to the inside of the turning direction is moved and oriented toward the inside of the turning direction of the host vehicle Ca. For example, in the example illustrated in FIG. 9, when the turning state detection unit 12 determines that the vehicle is in the turning state, the detection region modification unit 13 moves the position of the detection region Rac corresponding to the inside of the turning direction in a direction away from the center line L in the traveling direction of the host vehicle Ca, in other words, the detection region modification unit 13 moves the position of the detection region Rac in a direction so that a distance D is larger from the center line L in the traveling direction FD of the host vehicle Ca to the detection region Rac.

Additionally, while the host vehicle Ca is in the turning state, the detection region modification unit 13 sets the position of the detection region Rac corresponding to the inside of the turning direction based on the turning radius of the host vehicle Ca. More specifically, the detection region modification unit 13 sets the position of the detection regions Rac, Rbc corresponding to the inside of the turning direction so that the smaller the turning radius of the host vehicle Ca, the larger the distance D from the center line L in the traveling direction FD of the host vehicle Ca to the detection regions Rac, Rbc corresponding to the inside of the turning direction; and on the other hand the detection region modification unit 13 sets the position of the detection regions Rac, Rbc corresponding to the inside of the turning direction so that the larger the turning radius of the host vehicle Ca, the smaller the distance D from the center line L in the traveling direction FD of the host vehicle Ca to the detection regions Rac, Rbc corresponding to the inside of the turning direction.

For instance, the detection region modification unit 13 may maintain a map or an arithmetic expression or a correspondence relationship between the turning radius, and the detection regions Rac, Rbc modified in accordance with the turning radius. The detection region modification unit 13 modifies the detection regions Rac, Rbc based on the final turning radius specified in step 4.

Moreover, the device may be configured so that when moving the position of the detection regions Rac, Rbc corresponding to the inside of the turning direction in a direction away from the center line L in the traveling direction FD of the host vehicle Ca, the position of the detection regions Rac, Rbc corresponding to the inside of the turning direction is moved in the width direction of the vehicle, and the position of the detection regions Rac, Rbc corresponding to the inside of the turning direction is moved in the traveling direction of the host vehicle Ca so that the detection regions Rac, Rbc is not set within the traffic lane in which the host vehicle is traveling, or so that the detection regions Rac, Rbc is not within the two adjacent traffic lanes to the next-adjacent traffic lane with respect to the traveling traffic lane of the host vehicle Ca.

As described above, according to the present embodiment, in addition to the effects of the first embodiment, moving the detection regions Rac, Rbc corresponding to the inside of the turning direction of the host vehicle Ca, can thereby provide the advantage of effectively inhibiting the detection regions Rac, Rbc corresponding to the inside of the turning direction of the host vehicle from being set within the traffic lane in which the host vehicle Ca is traveling, and can thus suppress the trailing vehicle traveling in the traffic lane of the host vehicle Ca from being falsely recognized as an adjacent vehicle traveling in the traffic lane adjacent to the host vehicle Ca.

Figure 10:
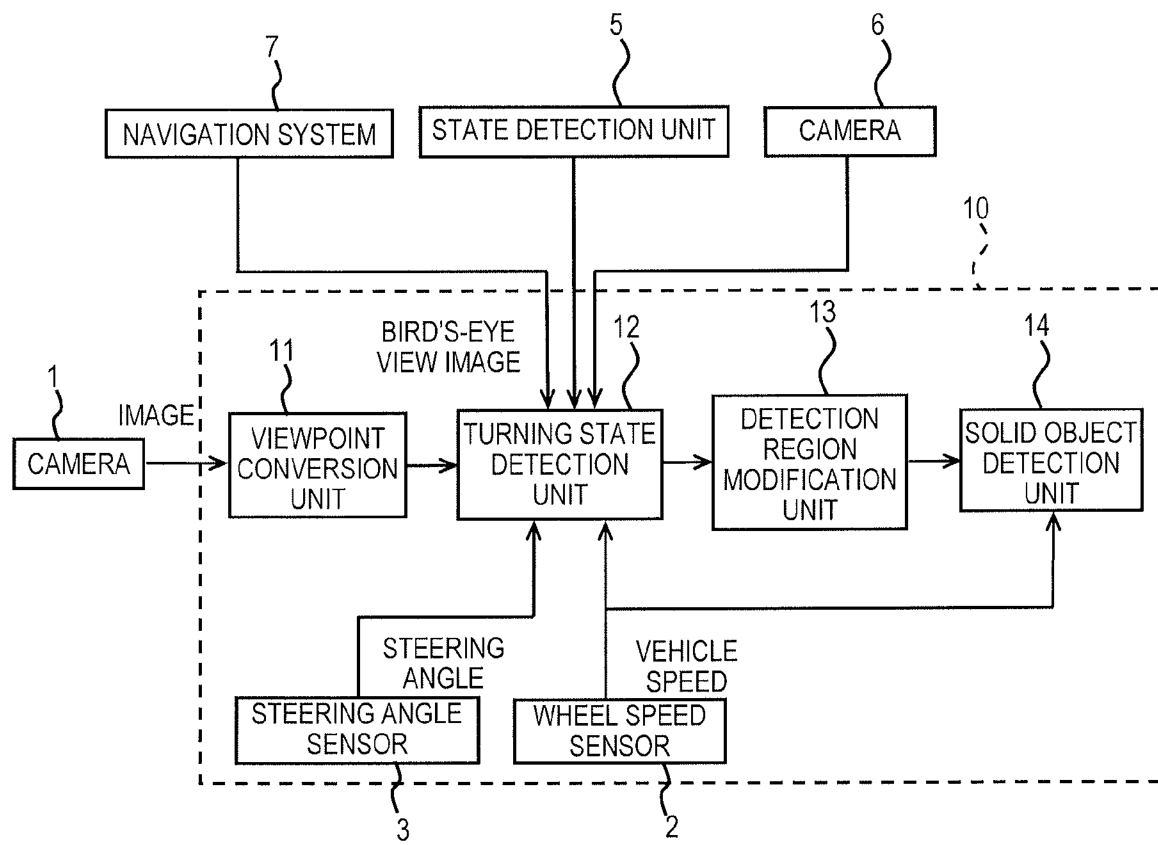
FIG. 10 is a block diagram functionally illustrating the configuration of a driving assistance device according to a fourth embodiment.

FIG. 10 illustrates a vehicle driving assistance device according to the fourth embodiment. The distinct feature between the vehicle driving assistance device according to the fourth embodiment, and the first embodiment is the technique that turning state detection unit 12 uses to detect the turning state. The features that are duplicated with the first embodiment will be omitted from this explanation and the following will contain mainly an explanation of the distinct feature.

More specifically, the turning state detection unit 12 can read information from a state detection unit 5, a camera 6, and a navigation system 7. The state detection unit 5 is configured by various sensors for detecting respectively the operation state of the accelerator pedal, the brake pedal, and the indicators initiated by the driver, and the vehicle state such as the yaw rate or the lateral acceleration. Additionally, a camera 6 is placed at the front part of the host vehicle Ca; the camera 1 periodically photographs the scenery in the traveling direction FD of the host vehicle Ca, and hereby chronologically outputs a captured image (imaging means). The navigation system 7 stores map information wherein the road information is linked to the position information, and acquires the position of the host vehicle Ca from the detection by a GPS sensor, to thereby display the present position of the host vehicle Ca in the map information, and to provide route guidance to a destination point.

With this type of configuration, the turning state detection unit 12 in the first embodiment would predict the shape of the road using the images taken from behind the vehicle by the camera 1. However, the turning state detection unit 12 may use the images of the front of the vehicle taken by the camera 6, to recognize a traffic lane, and thereby predict the turning state.

Furthermore, the turning state detection unit may predict the shape of the road from the operation states initiated by the driver (for example, the accelerator pedal, the brake pedal, and the indicators, and of the steering wheel and so forth) as detected by the state detection unit 5. Moreover, the turning state detection unit 12 predicts the turning state in accordance with the map information or the present position information of the host vehicle Ca from the navigation system 7 and so forth.

In the above described embodiment, the turning state detection unit 12 computes the turning radius of the host vehicle Ca as illustrated in formula 1 based on the speed of the host vehicle Ca, the steering angle of the host vehicle Ca, and various elements regarding the vehicle. However, the turning state detection unit 12 may compute the turning radius of the vehicle based on the difference in a wheel speed of the wheels provided to the host vehicle Ca, and various elements regarding the vehicle, or may compute the turning radius of the host vehicle Ca based on captured images from camera 1, or camera 6. Finally, the turning state detection unit 12 may compute the turning radius of the host vehicle Ca based on the yaw rate used as the vehicle state obtained from the state detection unit 5, or the lateral acceleration, and the vehicle speed, or the turning state detection unit 12 may compute the turning radius of the host vehicle Ca based on the map information obtained from the navigation system 7 and the position of the host vehicle Ca.

According to such an embodiment, various techniques can be used for predicting the turning state, and for computing the turning radius of the host vehicle Ca. Hereby, the turning state can be accurately predicted, and the turning radius of the host vehicle Ca can be accurately detected. As a result, the form of the detection region can be appropriately modified, and it is thereby possible to effectively suppress the false detection of the solid objects.

Figure 11:
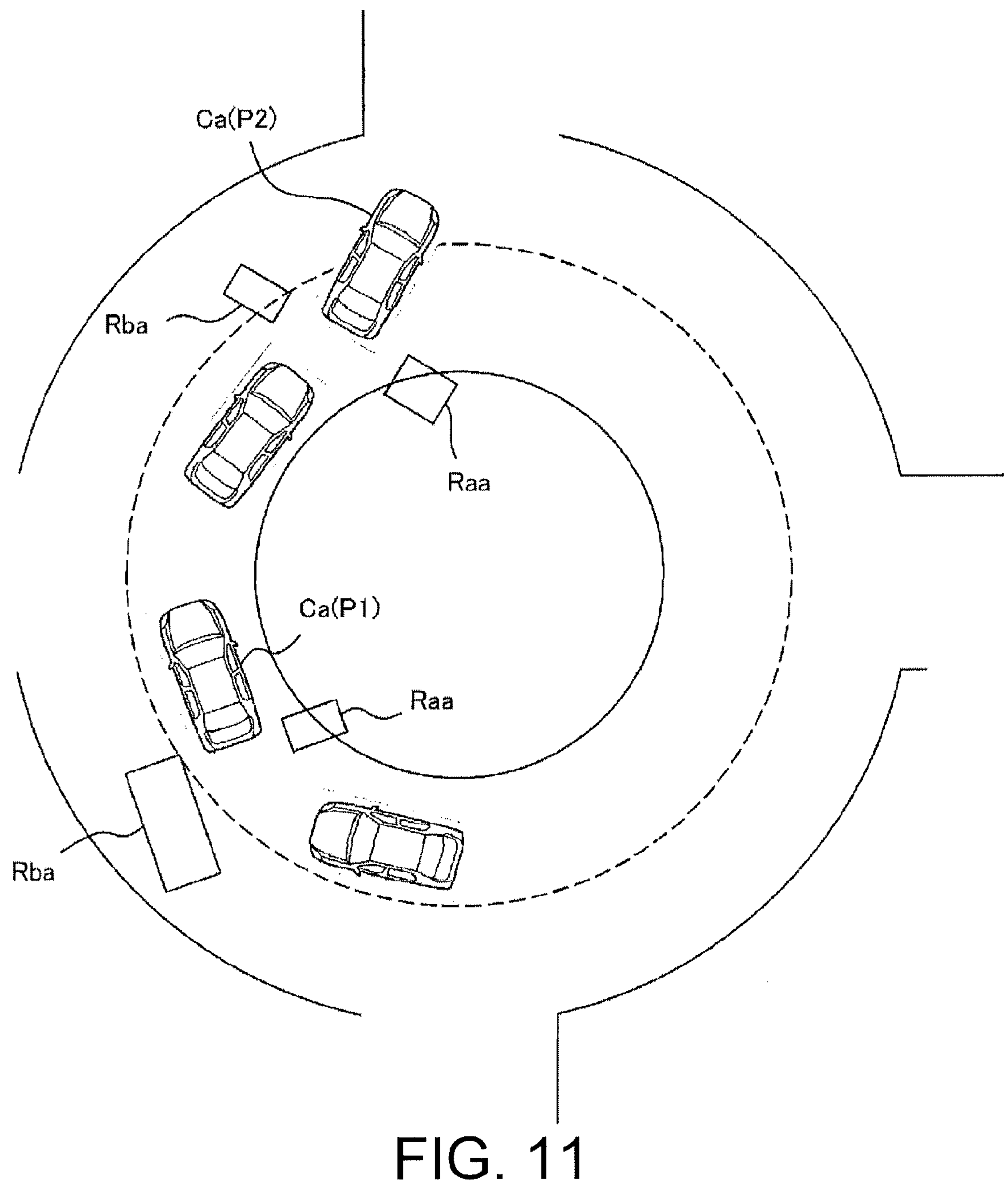
FIG. 11 illustrates one example of the detection regions Raa, Rba on a run-about (Example 1).
Figure 12:
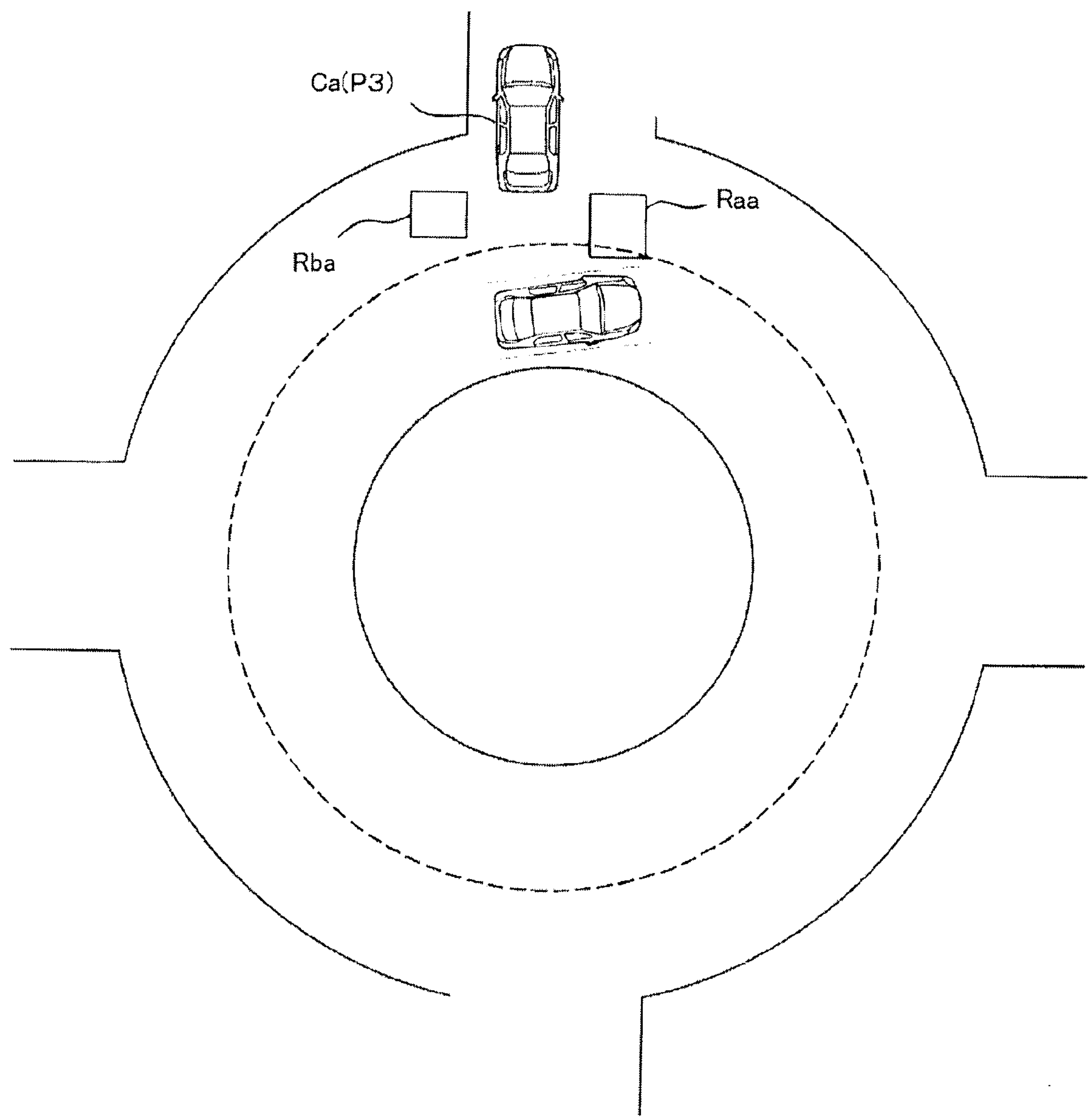
FIG. 12 illustrates one example of the detection regions Raa, Rba on a run-about (Example 2).

FIGS. 11 and 12 are explanatory diagrams schematically illustrating the modification of the form of the detection regions according to the fifth embodiment. A vehicle driving assistance device according to the fifth embodiment will be described below. The distinct feature between the vehicle driving assistance device according to the fifth embodiment, and the first embodiment is the technique the detection region modification unit 13 uses to modify the detection region. The features that are duplicated with the first embodiment will be omitted from this explanation and the following will contain mainly an explanation of the distinct feature. Further, as illustrated in FIG. 11 and FIG. 12, the fifth embodiment describes an example where the host vehicle Ca is traveling in a run-about (a traffic circle, or roundabout).

For instance, as illustrated in FIG. 11, in the situation where the host vehicle Ca enters a run-about, and is turning in the run-about (for example, the situation where the host vehicle Ca is that position P1 illustrated in FIG. 11), as in the first embodiment, the detection region modification unit 13 modifies the region length of the detection region (detection regions Raa, Rba) so that the region length is shorter in the traveling direction FD than the detection regions Ra, Rb which becomes a reference (refer to FIG. 5). Additionally, in this case, as in the first embodiment, the detection region modification unit 13 sets the detection regions so that the degree of modification to the detection region Raa corresponding to the inside of the turn is a larger than the degree of modification to the detection region Rba corresponding to the outside of the turn.

Further, as illustrated in FIG. 11, in the situation where the host vehicle Ca is turning in the run-about (for example, the situation where the host vehicle Ca is at the position P1 illustrated in FIG. 11), although the steering wheel is turned towards the right direction, thereafter in the situation where the host vehicle Ca is starting to proceed out of the run-about (for example, the situation where the host vehicle Ca moves from position P1 to position P2 illustrated in FIG. 11) the steering wheel is turned towards the left. Hereby, the host vehicle Ca is in the turning state in the left direction, and the detection region modification unit 13 alters the form of the detection region Rba so that the detection length is shorter in the traveling direction FD of the detection region Rba on the inside of the turn.

Moreover, in the situation where the host vehicle Ca is proceeding out of the run-about (for example, the situation where the host vehicle Ca moves from position P1 to position P2 illustrated in FIG. 11) turning the steering wheel from the right direction toward the left direction thereby causes the turning state detection unit 12 to detect the steering-wheel return operation, and detect a steering-wheel return amount due to the steering-wheel return operation. In this manner, when the steering-wheel return amount is detected, the detection region modification unit 13 initiates the process to return the detection regions Raa, Rba to an initial state (Ra, Rb illustrated in FIG. 5).

For example, in the example illustrated in FIG. 11, when the host vehicle Ca moves from position P1 to position P2, the steering wheel is turned from the right direction to the left direction, and the return amount toward the left direction is detected for the steering wheel. Hereby, the detection region modification unit 13 initiates the process to return to the initial state Ra for the detection region Raa corresponding to the inside of the turning direction when turning in the run-about. In other words, when the return amount towards the left direction is detected for steering wheel, the detection region modification unit 13 gradually extends the detection region Raa in the traveling direction FD so that the region length of the detection region Raa set at the rear-right of the host vehicle Ca becomes the same length as the region length of the detection region Ra in the initial state.

Moreover, in the situation where the host vehicle Ca moves from the position P2 illustrated in FIG. 11 towards the exit of the run-about up to a position P3 illustrated in FIG. 12, the return amount in the right direction is detected for the steering wheel, which also initiates the process for returning the detection region Rba set at the rear-left of the host vehicle to the initial state Rb. Further, in the situations illustrated in FIG. 11, and FIG. 12, the process for returning the detection regions Raa, Rba to the initial states Ra, Rb is initiated for the detection region Raa set at the rear-right of the host vehicle Ca prior to being initiated for the detection region Rba set at the rear-left of the host vehicle Ca. Therefore, in the situation illustrated in FIG. 12, the region length for the detection region Raa set at the rear right of the host vehicle Ca is set to be longer than the detection region Rba set at the rear left of the host vehicle Ca.

Additionally, in the present embodiment, the detection region modification unit 13 finally determines a return speed V for returning the detection region Rab, Rba to the initial states Ra, Rb based on the steering-wheel return amount. Here, FIG. 13 illustrates one example of the relationship between the return speed V of returning the detection regions Raa, Rba to the initial states Ra, Rb, and the steering-wheel return amount Q.

Figure 13:
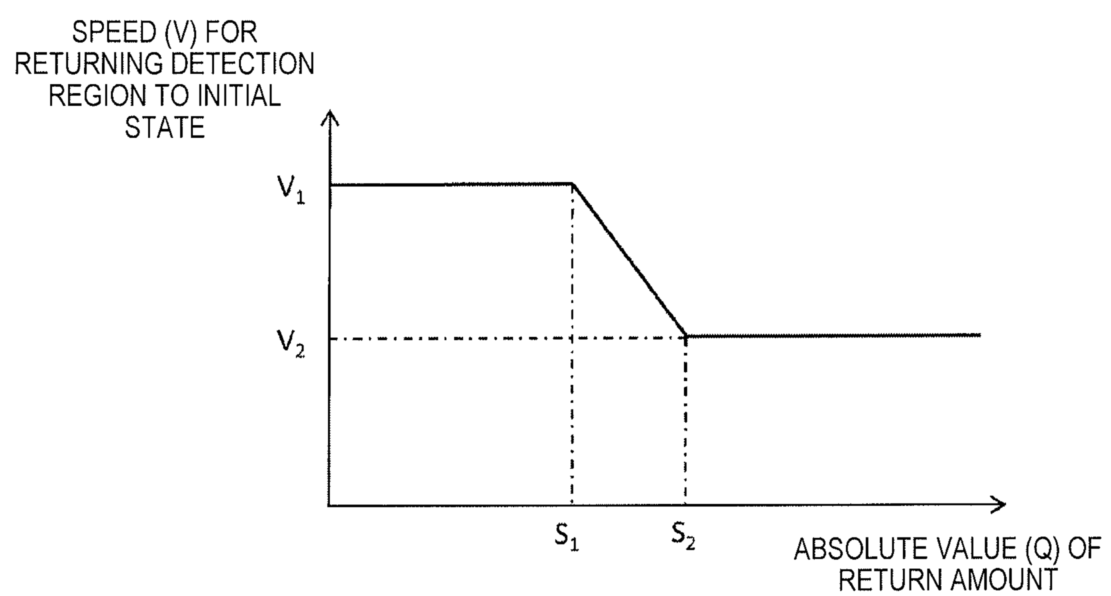
FIG. 13 illustrates one example of the relationship between the return speed of returning the detection regions Raa, Rba to an initial state, and the steering-wheel return amount.

As illustrated in FIG. 13, the larger the absolute value of the steering-wheel return amount Q, the slower the return speed V set by the detection region modification unit 13 for returning the shortened region length of the detection regions Raa, Rba to the initial states Ra, Rb; and the smaller the absolute value of the steering-wheel return amount Q, the faster the return speed V set by the detection region modification unit 13 for returning the shortened region length for the detection regions Raa, Rba to the initial states Ra, Rb. More specifically, as illustrated in FIG. 13, the detection region modification unit 13 will return the detection regions Raa, Rba to the initial states Ra, Rb at a predetermined speed V1 when the absolute value of the steering-wheel return amount Q is less than a predetermined value S1; in addition, the detection region modification unit 13 will return the detection regions Raa, Rba to the initial states Ra, Rb at a predetermined speed V2 which is faster than the predetermined speed V1 when the absolute value of the steering-wheel return amount Q is not less than a predetermined value S2 which is larger than the predetermined value S1. Further, when the absolute value of the steering-wheel return amount Q is greater than or equal to the predetermined value S1, and less than the predetermined value S2, the detection regions Raa, Rba is returned to the initial states Ra, Rb at a speed where the larger the absolute value of the steering-wheel return amount Q the slower the return speed within a range from the predetermined speed V1 to the predetermined speed of V2. Hereby, in the fifth embodiment, the larger the absolute value of the steering-wheel return amount Q, the longer the time needed for returning the shortened region length of the detection regions Raa, Rba to the initial states Ra, Rb, and the smaller the absolute value of the steering-wheel return amount Q, the shorter the time needed for returning the shortened region length for the detection regions Raa, Rba to the initial states Ra, Rb.

Figure 14:
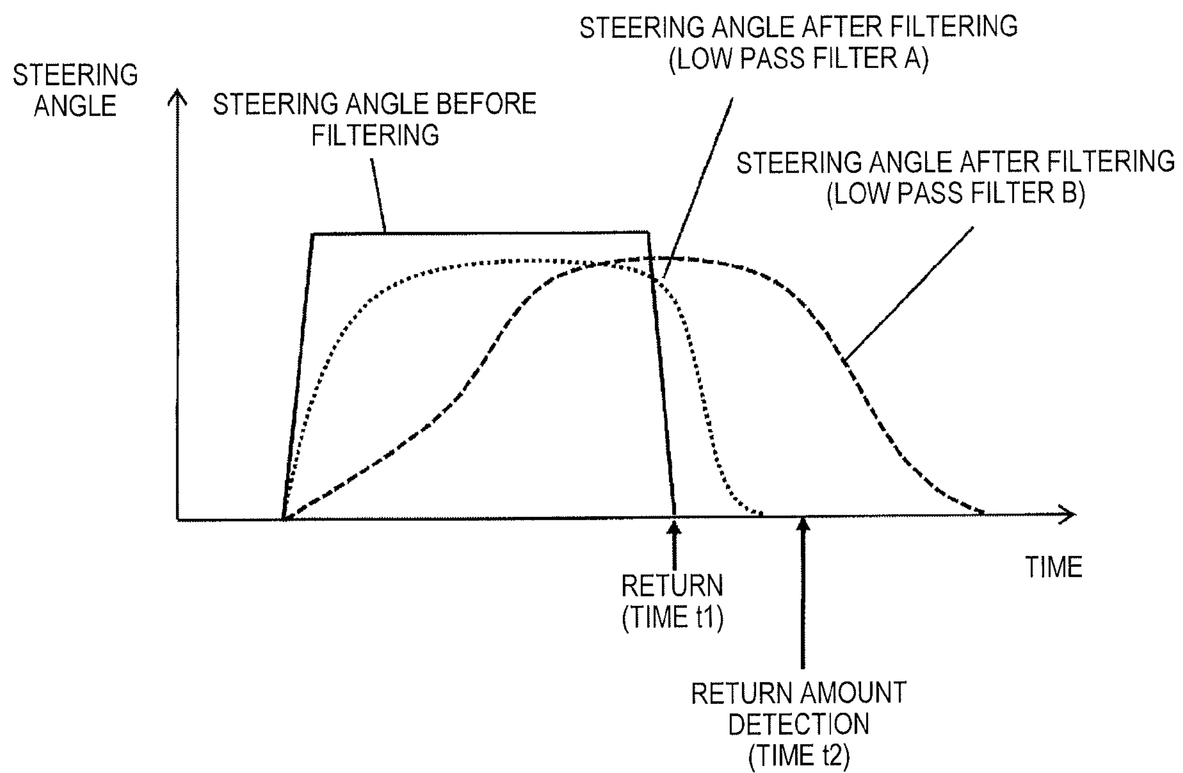
FIG. 14 is a diagram for describing the method used for detecting the steering-wheel return amount.

Moreover, the detection methods used for detecting the steering-wheel return amount are not particularly limited, and in the present embodiment the turning state detection unit detects the steering-wheel return amount Q based on a variation in the steering angle detected by the steering angle sensor 3. Here, FIG. 14 is a diagram for describing the method used for detecting the steering-wheel return amount. The following description of the detection method for detecting the steering-wheel return amount is made with reference to FIG. 14.

Namely, first, the turning state detection unit 12 processes the steering angle detected by the steering angle sensor 3 by using low pass filters having different characteristics (low pass filter A, and low pass filter B). Here, as illustrated in FIG. 14, the low pass filter A has high (fast) tracking (responsiveness) with respect to the steering angle detected by the steering angle sensor 3, and the low pass filter B has low (slow) tracking (responsiveness) with respect to the steering angle detected by the steering angle sensor 3.

Taking the characteristics of these low pass filters into account, as illustrated in FIG. 14, the turning state detection unit 12 detects the steering-wheel return amount Q by taking the difference between the steering angle filtered with the low pass filter A, and the steering angle filtered with the low pass filter B at a time after a predetermined time has passed (for example time t2 illustrated in FIG. 14) from the time (time t1 illustrated in FIG. 14) when the steering-wheel return was performed.

The detection region modification unit 13 determines whether the steering-wheel return amount acquired from the turning state detection unit 12 is a positive value or a negative value to determine the steering-wheel return direction. For example, if the unit is designed so that when the steering-wheel return operation is performed towards the left direction, the steering-wheel return amount is detected as a positive value, and when the steering-wheel return operation is performed towards the right direction, the steering-wheel return amount is detected as a negative value, then the detection region modification unit 13 can determine that the steering wheel is moving in the left direction when the steering-wheel return amount detected is a positive value, and thus return the rear right detection region Raa to the initial state Ra.

As above described, in the present embodiment, as illustrated in FIG. 11 and FIG. 12, in situations where the host vehicle Ca proceeds out of a run-about and the like, when a steering-wheel return is performed, the detection regions Raa, Rba with shortened region length is gradually returned to the initial states Ra, Rb based on the steering-wheel return amount. Hereby, in situations where the host vehicle Ca is proceeding out of the run-about and the like, it is possible to avoid detecting a trailing vehicle traveling in the same traffic lane as the host vehicle Ca in the detection region Raa, Rab, thus effectively preventing such kind of a trailing vehicle from being falsely recognized as an adjacent vehicle traveling in the traffic lane adjacent to the host vehicle Ca.

Further, in accordance with the present embodiment, it is possible to effectively address the following problems. In other words, there is the problem that if the radius of the run-about is small, and the steering-wheel return amount Q is large, the detection regions Raa, Rba tend to be set in the traffic lane that the host vehicle Ca is traveling in, and thus there is the problem of false detection of the trailing vehicle traveling in the traffic lane that the host vehicle Ca is traveling in. Additionally, if the steering-wheel return amount Q is large, there is the tendency for the driver of the host vehicle Ca to proceed out of the run-about at a relatively slower speed for the purpose of safety, and depending on the return speed for returning the detection region Raa, Rab to the initial states Ra, Rb there is a case where the detection region Raa, Rab with a shortened region length would be returned to the initial states Ra, Rb before the host vehicle Ca proceeded out of the run-about. Regarding such a problem, as illustrated in FIG. 13, in the present embodiment, the larger the absolute value of the steering-wheel return amount Q, the slower the return speed V for returning the detection regions Raa, Rba to the initial states Ra, Rb, and thereby it is possible to return the detection regions Raa, Rba to the initial states Ra, Rb in an appropriate time that corresponds to the shape of the run-about; further, it is possible to effectively prevent the false detection of the trailing vehicle traveling in the traffic lane that the host vehicle Ca is traveling in as an adjacent vehicle. Conversely, the smaller the absolute value of the steering-wheel return amount Q, the faster the return speed V for returning the detection regions Raa, Rba to the initial states Ra, Rb, and thereby after the host vehicle Ca has proceeded from the run-about, given that it is possible to return the detection regions Raa, Rba to the initial states Ra, Rb within a short amount of time, it is possible to detect an adjacent vehicle at the appropriate time.

Further, while the above-described fifth embodiment, provides an example of a configuration where the detection region Raa, Rba with shortened region length is gradually returned to the initial states Ra, Rb based on the steering-wheel switchback amount when the host vehicle Ca proceeds out of the run-about, the present invention is not limited to this configuration; for example, as with the above described second embodiment, the configuration may be such that when the detection regions Raa, Rba is rotated and moved in the reverse direction with respect to the turning direction of the host vehicle Ca, the rotated and moved detection regions Raa, Rba may be gradually returned to the initial states Ra, Rb based on the steering-wheel switchback amount. Furthermore, the configuration for this case may also be such that, the larger the absolute value of the steering-wheel return amount Q, the slower the return speed V for returning the rotated and moved detection regions Raa, Rba to the initial states Ra, Rb; and the smaller the absolute value of the steering-wheel return amount Q, the faster the return speed V for returning the rotated and moved region length for the detection regions Raa, Rba to the initial states Ra, Rb.

Finally, while the present embodiment provides an example of a configuration where the return process is initiated at the time the steering-wheel return amount is detected for returning the detection regions Raa, Rba, without being limited to this configuration, for example, the configuration may be such that as with the situational examples illustrated in FIG. 12, the return process may be initiated at the time the steering-wheel return amount is detected, and, the host vehicle Ca changes from the turning state to the non-turning state for returning the detection regions Raa, Rba to the initial states Ra, Rb.

Here ends the explanation of the driving assistance device according to embodiments of the present invention; however, the present invention is not limited to the above-described embodiments and may be modified insofar as the modifications are within the scope of the invention.

For instance, the above described embodiment presents an example of a configuration where the position of the detection region with respect to the host vehicle Ca, or the shape or area of the detection region is altered when the host vehicle Ca is in a turning state so as to exclude detection regions which may generate a false recognition of a solid object; however, without being limited to this configuration, the following configurations may also be provided. For example, there may be a configuration wherein when creating the difference image, if the host vehicle Ca is in the turning state, suppressing or prohibiting the output value for the difference in a region where false recognition of the solid object may be generated can thereby suppress the false recognition of a solid object in the region which may generate a false recognition of a solid object. Further, there may be a configuration wherein, when a difference image is converted to binary with a predetermined threshold whereby a region not less than the threshold is specified as a solid object, if the vehicle is in the turning state, increasing the threshold used in converting into binary the region where a false detection of an object may be generated can thereby suppress a false recognition of a solid object in the region which may generate a false recognition of a solid object.

Figure 15:
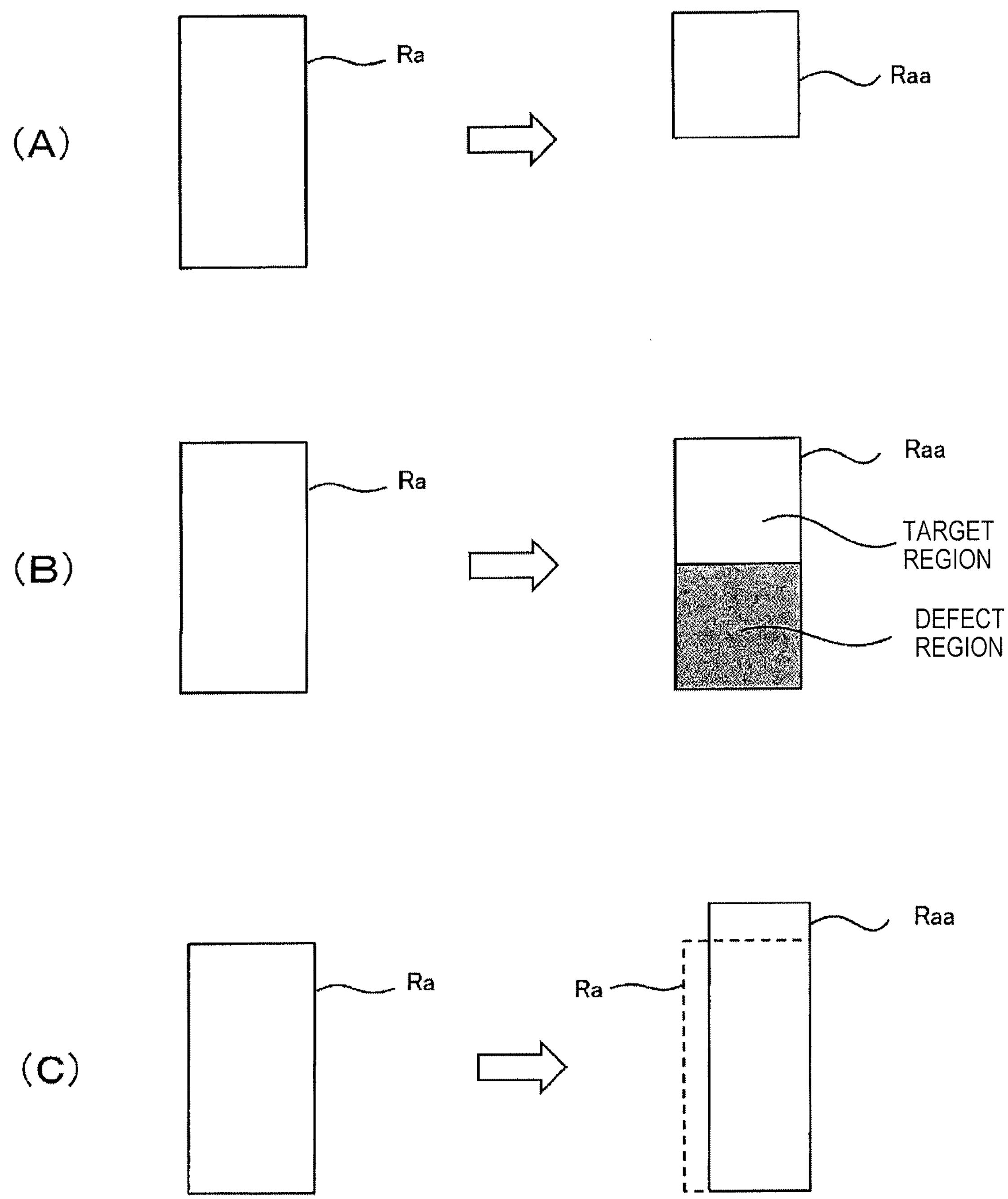
FIG. 15 is a diagram for describing another embodiment where the detection region is modified during the turning state.

Moreover, as illustrated in part (A) of FIG. 15, the above described embodiment presents an example of a configuration where altering the shape of the detection region to shorten the region length in the traveling direction thereby alters the area of the detection region; however, without being limited to this configuration, for example, as illustrated in part (B) of FIG. 15, there may be a configuration which excludes from the regions used in generating a difference image, a region from among the detection regions which may generate a false recognition of a solid object to thereby alter the area of the detection region. In other words, there may be a configuration that sets a defect region in the detection region, as illustrated in part (B) of FIG. 15, and generates a difference image in only a target region that excludes the defect region from the detection region. Additionally, in the same manner, excluding from the regions used in generating a difference image a region from among the detection regions which may generate a false recognition of an object thereby alters the area of the detection regions. Finally, FIG. 15 is a diagram for explaining another example for altering the form of a detection region.

Furthermore, the above-described embodiment presents an example of a configuration wherein the area of the detection region is altered to exclude a detection region which may generate a false detection of the solid object; however, without being limited to this configuration, for example, as illustrated in part (C) of FIG. 15, there may be a configuration wherein without altering the area of the detection region, only the shape of the detection region is altered to exclude the detection region which may generate a false detection of a solid object. For instance, in the example illustrated in part (C) of FIG. 15, the detection region Ra is narrowed on the inside of the turning direction, while the front portion of the detection region Ra is made to protrude by that amount so that the traveling traffic lane of the host vehicle Ca is not included in the detection region Ra when the host vehicle Ca is turning, and thereby the shape of the detection region may be altered without altering the area of the detection region.

Finally, the above described embodiment presents an example of a configuration where the position of detection regions A1, A2 is altered to exclude a detection region which may generate a false recognition of a solid object, which is accomplished by moving the position of the detection regions A1, A2 in the width direction of the vehicle, or rotating and moving the detection regions A1, A2; however, without being limited to this configuration, for example there may be a configuration which moves the position of the detection regions A1, A2 in the traveling direction FD of the host vehicle Ca to exclude detection regions which may generate a false recognition of a solid object.

The invention claimed is:

1. A driving assistance device comprising:

a turning state detection unit that detects a turning state of a host vehicle;

an imaging unit configured to be installed on the host vehicle, configured to capture an image of a predetermined range including detection regions corresponding to an adjacent traffic lane at a rear-left of the host vehicle and a rear-right of the host vehicle in a non-turning state, and configured to output the captured image;

a solid object detection unit that detects a trailing vehicle within the detection regions in a bird's-eye view image converted from the captured image using viewpoint conversion; and a detection region modification unit that alters an area of at least one of the detection regions so that the at least one of the detection regions in the bird's-eye view image inside of a turn becomes smaller within a range including a region closest to the host vehicle compared to the non-turning state when the turning state detection unit detects that the host vehicle is in the turning state.

2. The driving assistance device according to claim 1, further comprising a viewpoint conversion unit that converts the captured images taken by the imaging unit into bird's-eye view images using viewpoint conversion;

the solid object detection unit detects a solid object in the detection regions from among a plurality of differential images which correspond to a time difference between the bird's eye view images based on the differential images in the detection regions.

3. The driving assistance device according to claim 1, wherein the detection region modification unit shortens a region length of the at least one of the detection regions so that the region length of the at least one of the detection regions become shorter as the turning radius of the host vehicle becomes smaller.

4. The driving assistance device according to claim 1, wherein the detection region modification unit alters a shape or the area of the at least one of the detection regions so that a region length of the detection region corresponding to an inside of a turn has a larger degree of modification than a region length of the detection region corresponding to an outside of the turn.

5. The driving assistance device according to claim 1, wherein the turning state detection unit further includes a return amount detection unit that detects a return amount during a steering-wheel return operation;

the detection region modification unit alters the position of the at least one of the detection regions with respect to the host vehicle, or the area of the at least one of the detection regions from an initial state for the at least one of the detection regions in accordance with a determination that the host vehicle is in a turning state, and thereafter returns the position of the at least one of the detection regions with respect to the host vehicle, or the area of the at least one of the detection regions to the initial state when the return amount detection unit detects a steering wheel return amount; and the detection region modification unit sets a slower speed for returning the position of the at least one of the detection region with respect to the host vehicle, or the area of the at least one of the detection regions to the initial state when the return amount detection unit detects the steering wheel return amount as compared to the speed for altering the position of the at least one of the detection regions with respect to the host vehicle or the area of the at least one of the detection regions from the initial state for the at least one of the detection regions in accordance with the determination that the host vehicle is in the turning state.

6. The driving assistance device according to claim 1, further comprising a lane-change intent detection unit configured to detect an intent to change traffic lanes; and the detection region modification unit when the lane-change intent detection unit detects the intent to change traffic lanes, and the host vehicle transitions from the turning state to a non-turning state, and the least one of the detection region is returned to an initial state, the detection region modification unit sets a slower speed for returning the position of the least one of the detection regions with respect to the host vehicle, or the area of the detection regions to the initial state when the return amount detection unit detects the steering wheel return amount as compared to the speed for altering the position of the least one of the detection regions with respect to the host vehicle, or the area of the least one of the detection regions from the initial state for the least one of the detection regions in accordance with the determination that the host vehicle is in the turning state.

7. A driving assistance device comprising:

a turning state detection unit that detects a turning state of a host vehicle;

an imaging unit configured to be installed on the host vehicle, and configured to capture an image of a predetermined range including detection regions set at a rear-left of the host vehicle and a rear-right of the host vehicle;

a solid object detection unit that detects a solid object within the detection regions based on the captured image; and a detection region modification unit configured to rotate and move a position of at least one of the detection regions with respect to the host vehicle in a reverse direction to a turning direction of the host vehicle based on the turning state of the host vehicle when the turning state detection unit detects that the host vehicle is in the turning state to prevent false recognition of a solid object, the detection region modification unit rotates and moves the at least one of the detection region so that an angle of rotation for the detection region corresponding to an inside of a turn is larger than the angle of rotation for the detection region corresponding to an outside of the turn.

8. The driving assistance device according to claim 7, wherein the detection region modification unit rotates and moves the detection regions so that the angles of rotation of the detection regions with respect to a center line in a traveling direction of the host vehicle becomes larger as the turning radius of the host vehicle becomes smaller.

9. The driving assistance device according to claim 1, further comprising a turning state prediction unit that is programmed to predict a turning state of the host vehicle as a predicted turning state; and the detection region modification unit determining a likelihood of the predicted turning state existing based on the turning state of the host vehicle detected by the turning state detection unit and the predicted turning state predicted by the turning state prediction unit, the detection region modification unit altering the positions of the at least one of the detection region with respect to the host vehicle, or altering the area of the at least one of the detection regions based on the predicted turning state when a likelihood of the predicted turning state is not less than a predetermined value, and the detection region modification unit altering the position of the at least one of the detection regions with respect to the host vehicle, or altering the area of the at least one of the detection regions based on the turning state of the host vehicle detected by the turning state detection unit when a likelihood of the predicted turning state is less than a predetermined value.

10. The driving assistance device according to claim 9, wherein the turning state prediction unit includes at least one of:

a prediction unit programmed to predict the turning state of the host vehicle based on an operations state of a driver; and a prediction unit programmed to compute the turning state of the host vehicle from among a prediction unit that predicts the turning state based on the imaging unit, a captured image output from an additional imaging unit placed at the front of the vehicle, and a prediction unit programmed to compute the turning state of the host vehicle based on map information which links road information to position information, and the position of the host vehicle.

11. The driving assistance device according to claim 5, wherein the detection region modification unit alters the position of the least one of the detection regions with respect to the host vehicle or the area of the least one of the detection regions from the initial state for the least one of the detection regions in accordance with the determination that the host vehicle is in a turning state, and thereafter, determines a speed based on the steering wheel return amount for returning the position of the least one of the detection regions with respect to the host vehicle, or the area of the least one of the detection regions to the initial state when the return amount detection unit detects a steering wheel return amount, and returns the position of the least one of the detection regions with respect to the host vehicle, or the area of the least one of the detection regions to the initial state based on the determined speed.

12. The driving assistance device according to claim 5, wherein the detection region modification unit alters the position of the at least one of the detection regions with respect to the host vehicle or the area of the at least one of the detection regions from the initial state for the at least one of the detection regions in accordance with the determination that the host vehicle is in a turning state, and thereafter, determines a speed based on the steering wheel return amount for returning the position of the at least one of the detection regions with respect to the host vehicle, or the area of the at least one of the detection regions to the initial state when the return amount detection unit detects a steering wheel return amount, and returns the position of the at least one of the detection regions with respect to the host vehicle, or the area of the at least one of the detection regions to the initial state based on the determined speed.

13. A driving assistance method comprising:

imaging a predetermined range including detection regions corresponding to an adjacent traffic lane at a rear-left of a host vehicle and a rear-right of the host vehicle in a non-turning state, and detecting a trailing vehicle within the detection regions;

detecting a turning state of the host vehicle; and altering an area of at least one of the detection regions so that the at least one of the detection regions in the bird's-eye view image inside of a turn becomes smaller within a range including a region closest to the host vehicle compared to the non-turning state.

* * * * *